United States Patent
Shikano

(10) Patent No.: US 7,019,631 B2
(45) Date of Patent: Mar. 28, 2006

(54) INDICATOR

(75) Inventor: Toshiya Shikano, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 162 days.

(21) Appl. No.: 10/749,254

(22) Filed: Dec. 31, 2003

(65) Prior Publication Data

US 2004/0160153 A1    Aug. 19, 2004

(30) Foreign Application Priority Data

Jan. 7, 2003    (JP)    ............... 2003-000908

(51) Int. Cl.
*B60Q 1/26* (2006.01)

(52) U.S. Cl. ............... 340/468; 340/407.1; 340/425.5; 340/458; 340/815.5; 340/815.54; 362/507; 362/509

(58) Field of Classification Search ........... 340/468, 340/425.5, 475, 479, 407.1, 815.5, 815.4, 340/815.45, 815.55, 815.57, 458, 425.45, 340/815.54; 359/487, 495, 619, 645; 362/507, 362/509, 510; 313/112

See application file for complete search history.

(56) References Cited

U.S. PATENT DOCUMENTS 3,912,920 A * 10/1975 Kubota ................. 362/19
5,535,054 A * 7/1996 Shibuya ................. 359/487
5,995,284 A * 11/1999 Vanderwerf ............ 359/487

FOREIGN PATENT DOCUMENTS

JP    08-127297    5/1996

* cited by examiner

*Primary Examiner*—Hung Nguyen
(74) *Attorney, Agent, or Firm*—Hamre, Schumann, Mueller & Larson, P.C.

(57) ABSTRACT

An indicator equipped with a polarized light splitter, which passes and reflects an un-polarized light irradiated from a light source and divides the polarized light into a p-polarized light whose oscillation direction of an electric field is parallel to an incidence plane and an s-polarized light whose oscillation direction of an electric field is perpendicular to the incidence plane. In this indicator, at least one of the p-polarized light and s-polarized light is emitted from the polarized light splitter as a horizontal polarized light whose oscillation direction of an electric field is substantially parallel to a ground.

14 Claims, 10 Drawing Sheets

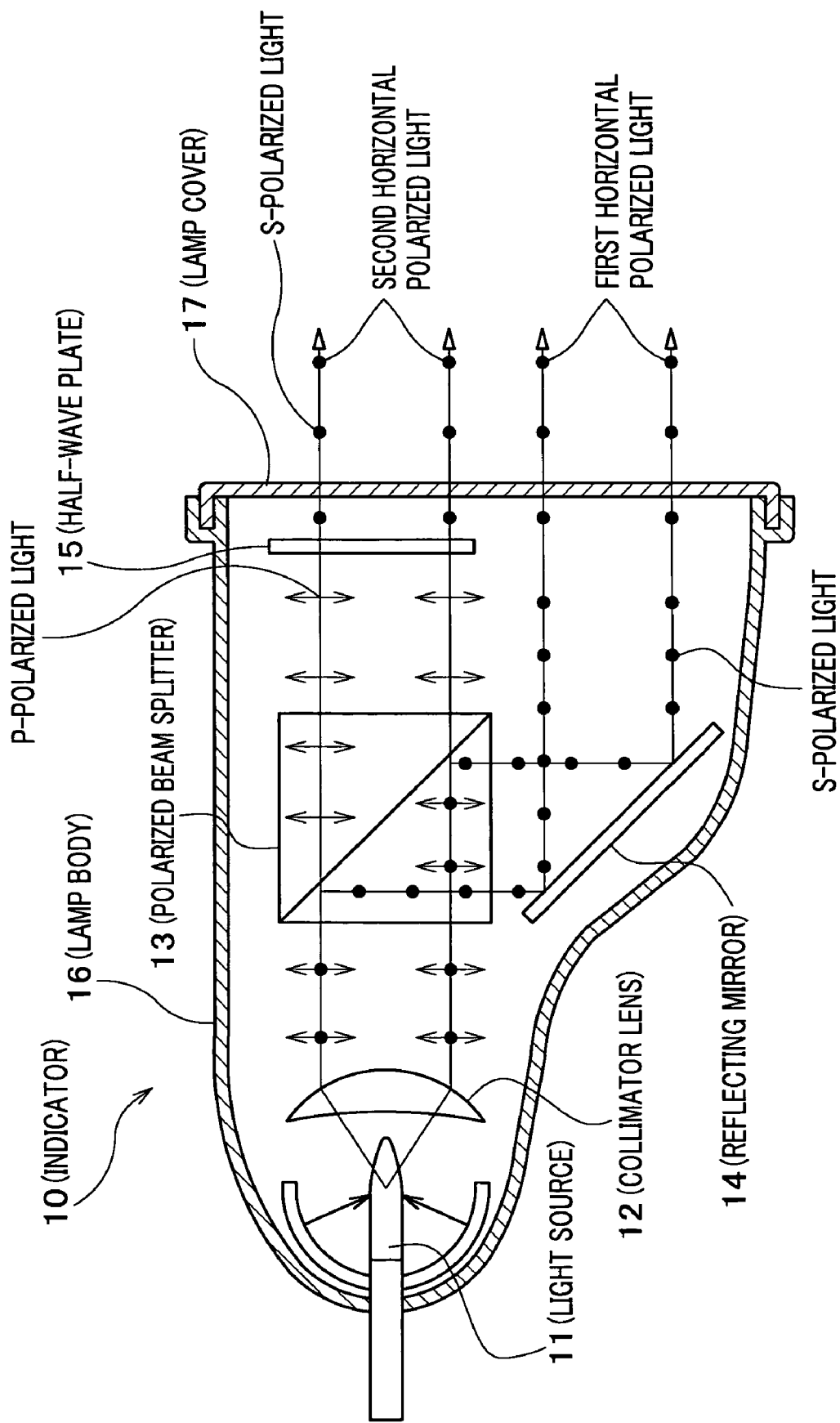

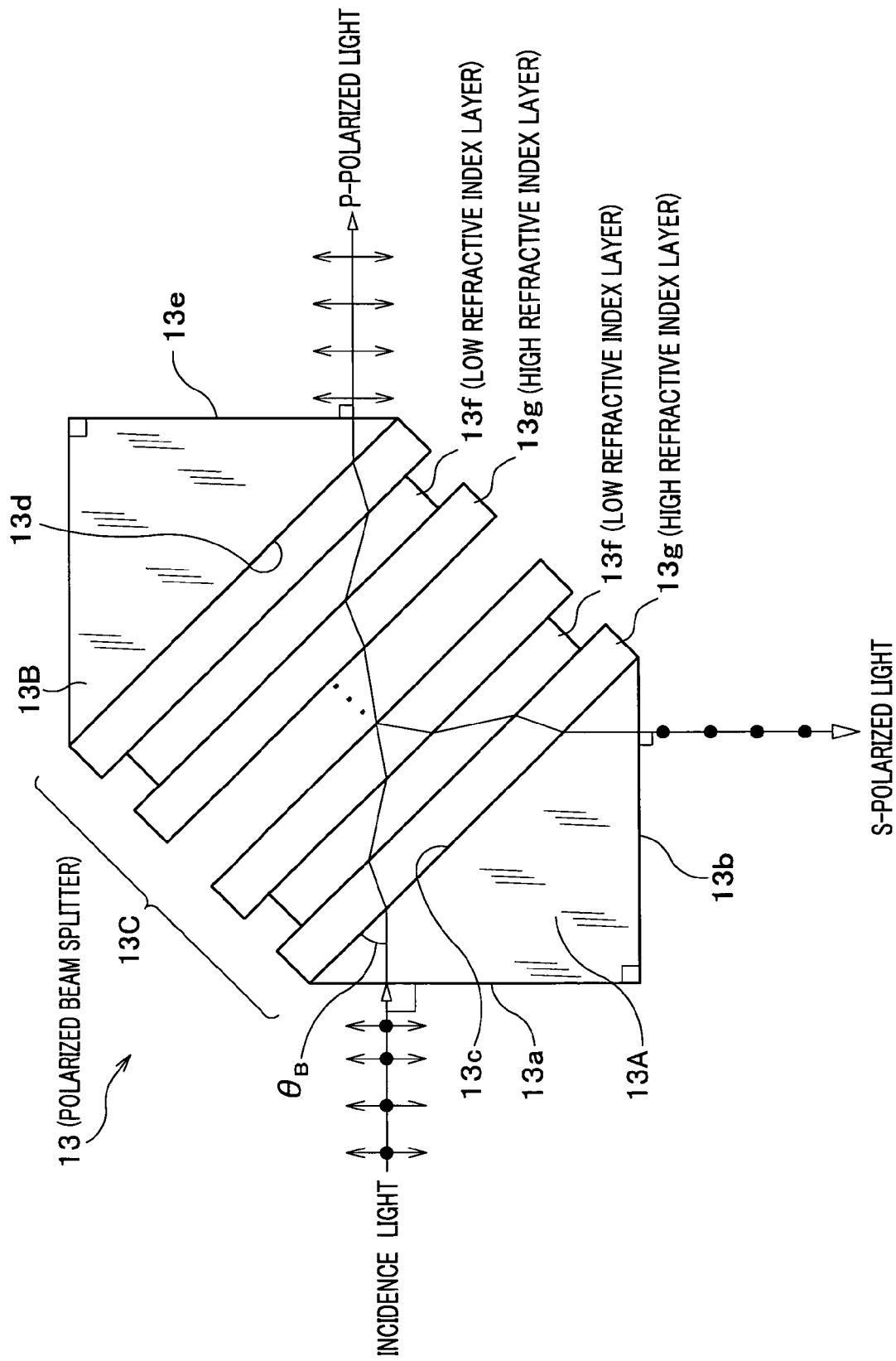

REGION ILLUMINATED BY REAR FOG LAMP 40B

REGION ILLUMINATED BY REAR FOG LAMP 20A

REGION ILLUMINATED BY WIDTH INDICATOR 30B
REGION ILLUMINATED BY WIDTH INDICATOR 30A

REGION ILLUMINATED BY REAR FOG LAMP 40B

REGION ILLUMINATED BY REAR FOG LAMP 40A

REGION ILLUMINATED BY WIDTH INDICATOR 50B

REGION ILLUMINATED BY WIDTH INDICATOR 50A

INDICATOR

BACKGROUND OF THE INVENTION

1. Field of the Invention

The present invention relates to an indicator of a vehicle. More specifically, the present invention relates to an indicator that makes a vehicle more visible from a surrounding area even in an adverse condition, such as thick fog or heavy rain.

2. Description of Relevant Art

Conventionally, an indicator, by which a surrounding area (other vehicles, pedestrians etc.) is notified of the existence or information (moving directions etc.) of a vehicle, has been provided on the vehicle.

As examples of the indicator, a rear fog lamp, a width indicator, a number-plate light, a taillight, a parking light, a brake light, a direction indicator, and a hazard indicator can be cited.

These kinds of indicators have to be visible from a surrounding area, especially, even in the adverse condition, such as thick fog or heavy rain.

As an example of these kinds of indicator, a brake light disclosed in Japanese unexamined patent publication JP H08-127297 has been discovered (see Page 1 and 2, FIG. 1).

In this Japanese unexamined patent publication, a brake light composed of a plurality of LED lamps and clear beads, which are provided in the bumper made of a clear or diaphanous synthetic resin, is disclosed. In this brake light, the visibility of the brake light is improved by scattering the light emitted from respective LED lamps using clear beads.

In the conventional indicator, such as the indicator disclosed in Japanese unexamined patent publication, however, un-polarized light is emitted from a light source. Un-polarized light tends to be diffused in a horizontal direction and a perpendicular direction with respect to the ground. Since un-polarized light is widely diffused under the adverse condition, such as in a thick fog or a heavy rain, the contour of the vehicle is obscured and thus the visibility of the vehicle from a surrounding area becomes worse. In other words, since the contour of the vehicle becomes unclear when the vehicle is looked from a surrounding area, the presence of the vehicle is not accurately recognized from a surrounding area.

In particular, in case of the rear fog lamp, as shown in FIG. 9A, since un-polarized light emitted from respective rear fog lamps 40A and 40B are diffused in a horizontal direction and a perpendicular direction with respect to a ground, the contour of the vehicle V is obscured when the vehicle V is looked from a surrounding area. Thus, the width of the vehicle V, and the distance from a following vehicle to the vehicle V cannot be recognized by the following vehicle correctly.

In case of the indicator used as width indicator, as show in FIG. 10A, since un-polarized light emitted from respective width indicators 50A and 50B is diffused in a horizontal direction and a perpendicular direction with respect to a ground, the contour of the vehicle V is obscured when the vehicle V is looked from a surrounding area. Thus, the width of the vehicle V, and the distance from the oncoming vehicle to the vehicle V cannot be recognized by the oncoming vehicle correctly.

Therefore, there has been required an indicator that can be recognized in an adverse condition, such as thick fog or heavy rain, and that enables the existence of the vehicle adopting the indicator be recognized in a surrounding area.

SUMMARY OF THE INVENTION

The present invention relates to an indicator provided on a vehicle.

In this indicator, a polarized light splitter, which passes and reflects an un-polarized light irradiated from a light source and divides the polarized light into a p-polarized light whose oscillation direction of an electric field is parallel to an incidence plane and an s-polarized light whose oscillation direction of an electric field is perpendicular to the incidence plane.

In this indicator, additionally, at least one of the p-polarized light and s-polarized light is emitted from the polarized light splitter as a horizontal polarized light whose oscillation direction of an electric field is substantially parallel to a ground.

According to this indicator having these constructions, the oscillation direction of the electric field of at least one of the p-polarized light and the s-polarized light, which are obtained by splitting the incidence light using the polarized light splitter, is substantially parallel with respect to a ground. Here, since the horizontal polarized light (the light goes in parallel to a ground) is not so diffused under the adverse condition, such as in thick fog or heavy rain, the visibility of the vehicle from a surrounding area can be improved.

In the present invention, it is preferable that a converter, which converts the p-polarized light into the s-polarized light and converts the s-polarized light into the p-polarized light, be provided in the irradiator.

In this indicator, at least one of the p-polarized light and s-polarized light is emitted from the polarized light splitter as a first horizontal polarized light whose oscillation direction of an electric field is substantially parallel to a ground, and the other of the p-polarized light and s-polarized light is emitted from the polarized light splitter as a second horizontal polarized light whose oscillation direction of an electric field is substantially parallel to a ground after changing the polarization direction by the converter.

According to the indicator having these constructions, the light (un-polarized light) irradiated from the light source is sufficiently utilized for the irradiation of the light in comparison with the indicator, in which one of the p-polarized light and the s-polarized light obtained by splitting the light in the polarized light splitter is emitted as the horizontal polarized light.

In the present invention, a polarized beam splitter that efficiently splits the light into the s-polarized light and the p-polarized light may be adoptable as the polarized light splitter.

In the present invention, additionally, a half-wave plate that easily converts the p-polarized light into the s-polarized light and easily converts the s-polarized light into the p-polarized light may be adoptable as the converter.

The indicator according to the present invention may be adoptable as a rear fog lamp or a width indicator of a vehicle. In this case, since the light emitted from the indicator is not easily diffused in a horizontal direction with respect to a ground in comparison with the conventional indicator emitting the un-polarized light, the presence of the vehicle adopting the present invention's indicator is surely recognized from an oncoming vehicle, a following vehicle, and pedestrian even if the vehicle is traveling in adverse conditions, such as thick fog or heavy rain.

In the present invention, still furthermore, if the indicator is positioned in the vicinity of the center-line side of the vehicle body when present invention's indicator is used for the width indicator or the rear fog lamp, the contour in the center-line side of the vehicle, to which a driver of the following vehicle is paying the attention, can be made clear. Thus, the visibility of the vehicle from an oncoming vehicle and a following vehicle can be improved. Here, the present invention's indicator may be used as a rear fog lamp, a width indicator, a number-plate light, a taillight, a parking light, a brake light, a direction indicator, and a hazard indicator.

BRIEF DESCRIPTION OF THE DRAWINGS

FIG. 3 is a side sectional view that schematically indicates the structure of the indicator 10.

FIG. 4 is a side sectional view that schematically indicates the structure of the polarized beam splitter 13 included in the indicator 10.

DETAILED DESCRIPTION OF THE PREFERRED EMBODIMENT

Next, preferred embodiments of the indicator according to the present invention will be explained with reference to the attached drawings.

In the following explanation, firstly, explanations about a p-polarized light, an s-polarized light, a horizontal polarized light, and a perpendicular polarized light will be carried out. Then, the construction and motion of the indicator according to the present embodiment, and the indicator applied to the rear fog lamp and the indicator applied to the width indicator of the vehicle will be explained.

Figure 1:
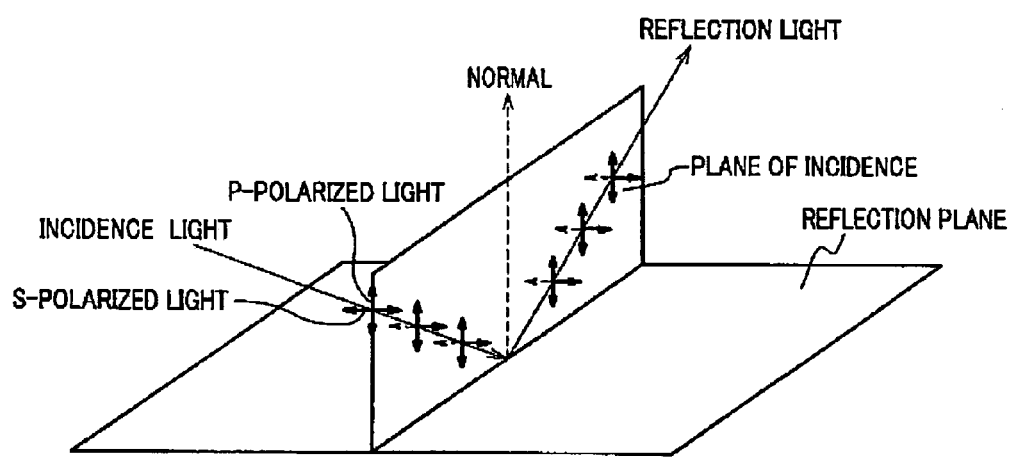
FIG. 1 is a schematic view used in order to explain a p-polarized light and s-polarized light.

P-Polarized Light, S-Polarized Light, Horizontal Polarized Light, and Perpendicular Polarized Light FIG. 1 is a schematic view used in order to explain a p-polarized light and an s-polarized light. FIG. 2 is a schematic perspective view used in order to explain the difference among an s-polarized light, a p-polarized light, a horizontal polarized light, and a perpendicular polarized light.

As shown in FIG. 1, the p-polarized light is a liner polarized light whose oscillation direction of the electric field (vector of the electric field) is parallel to a plane of incidence. The s-polarized light is a liner polarized light whose oscillation direction of the electric field is perpendicular to a plane of incidence.

Here, the plane of incidence is a plane containing the normal at the point where incidence light strikes a reflection plane, and an optical axis of the incidence light. The p-polarized light and s-polarized light are defined with respect to the plane of incidence.

The perpendicular polarized light and the horizontal polarized light are defined with respect to a ground. Here, the polarization whose oscillation direction of the electric field is substantially parallel to a ground is defined as "a horizontal polarized light". The polarization whose oscillation direction of the electric field is substantially perpendicular to a ground is defined as "a perpendicular polarized light".

Figure 2A:
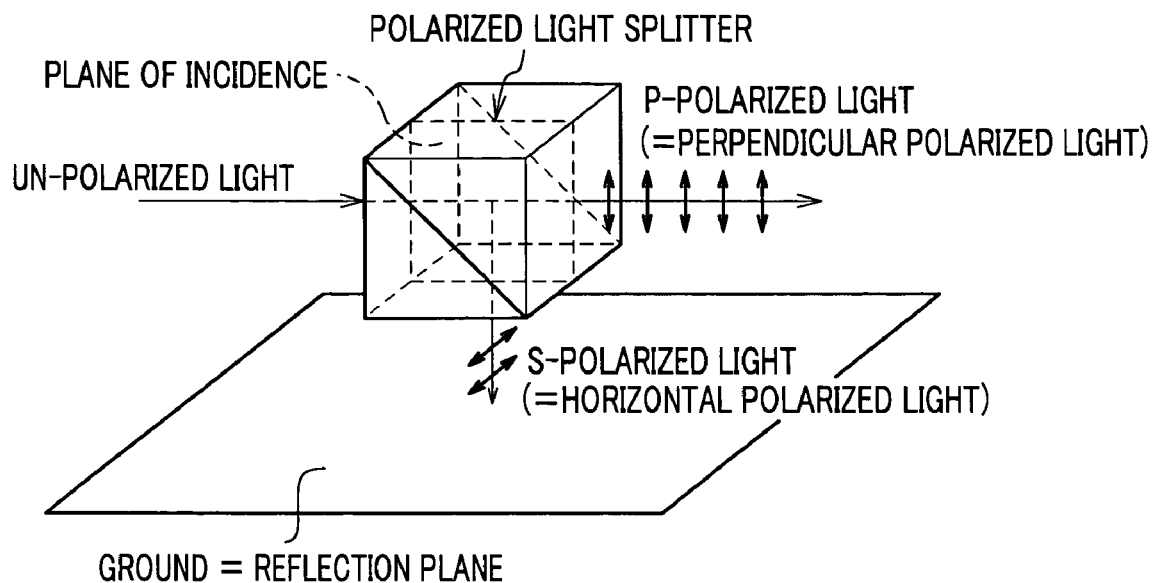
FIGS. 2A and 2B are schematic perspective views used in order to explain the difference among an s-polarized light, a p-polarized light, a horizontal polarized light, and a perpendicular polarized light.

As shown in FIG. 2A, therefore, if a polarized light splitter is placed so that the plane of incidence (hereinafter defined as "incidence plane") of the polarized light splitter is perpendicular to a ground, the p-polarized light passed through the polarized light splitter corresponds to the perpendicular polarized light and the s-polarized light corresponds to the horizontal polarized light. Here, if the polarized light splitter is placed so that the incidence plane of the polarized light splitter is perpendicular to a ground, a ground corresponds to the reflection plane of FIG. 1.

Figure 2B:
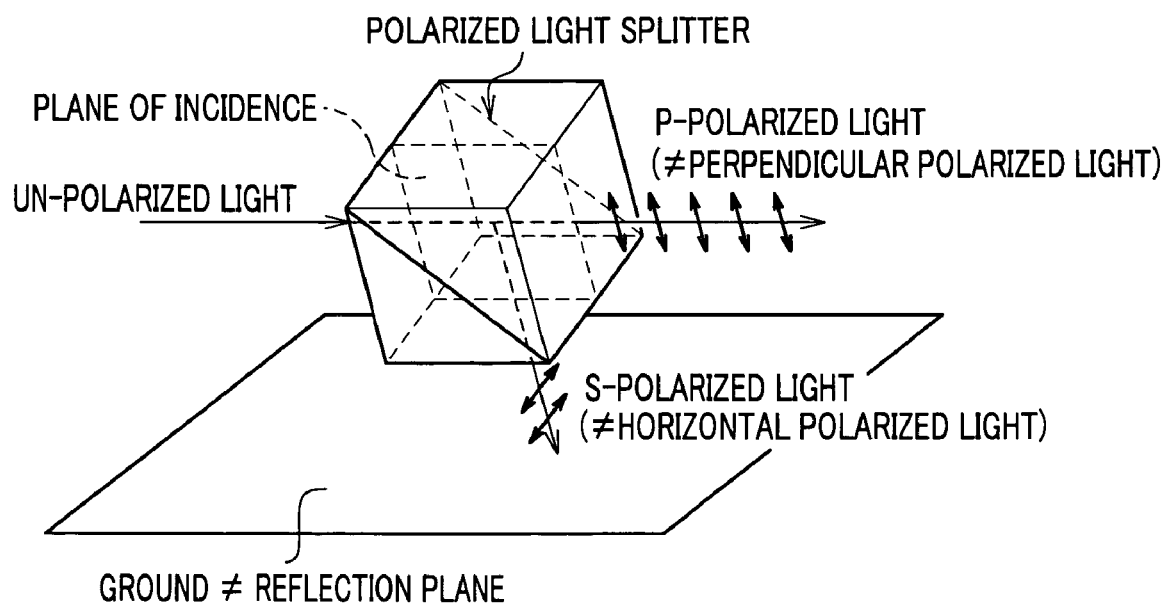

On the other hand, as shown in FIG. 2B, if the incidence plane of the polarized light splitter is not perpendicular to a ground, the p-polarized light and the s-polarized light do not correspond to the perpendicular polarized light and the horizontal polarized light, respectively.

Structure and Motion of the Indicator

Next, a structure and motion of the indicator according to the present invention will be explained with reference to FIG. 3 and FIG. 4.

FIG. 3 is a side sectional view that schematically indicates the structure of the indicator 10.

FIG. 4 is a side view that schematically indicates the structure of the polarized beam splitter 13 included in the indicator 10.

As shown in FIG. 3, the indicator 10 has a light source 11, a collimator lens 12, a polarized beam splitter 13, a reflecting mirror 14, and a half-wave plate 15.

Respective components of the indicator 10 are stored in a lamp body 16. An opening provided at opposite side with respect to the light source 11 of the lamp body 16 is covered by a lamp cover 17 made of clear materials, such as glass or acrylic resin. Hereinafter, more detailed explanations about respective components of the indicator 10 will be given.

In the present embodiment, a high intensity discharge lamp (HID lamp) is adopted as the light source 11. But other kinds of light sources, such as a halogen lamp and a light-emitting diode (LED) can be adoptable as the light source 11. The light (un-polarized light) emitted from light source 11 strikes on a surface of the collimator lens 12.

The collimator lens 12 aligns the irradiation angle of the light (un-polarized light) and changes the light (un-polarized light) into parallel beams of light. That is, the collimator lens 12 makes the light (un-polarized light) irradiated from the light source 11 into parallel beams of light by making angles of irradiation in alignment with one another.

Here, a concave mirror, such as a parabolic mirror and the like, may be adoptable instead of the collimator lens 12. The parallel beam (un-polarized light) passed through the collimator lens 12 strikes on the polarized beam splitter 13 as an incidence light.

The polarized beam splitter 13 is one to transmit and reflect the light. In the present embodiment, the incidence light (un-polarized light) passed through the collimator lens 12 is split into a p-polarized light and an s-polarized light by the polarized beam splitter 13.

The incidence plane of the polarized beam splitter 13 corresponds to the plane of incidence (incidence plane) of FIG. 1, if the reflection plane of FIG. 1 is regarded as a ground. The p-polarized light passed through the polarized beam splitter 13 corresponds to the perpendicular polarized light whose oscillation direction of the electric field is substantially vertical to a ground. The s-polarized light reflected by the polarized beam splitter 13 corresponds to the horizontal polarized light whose oscillation direction of the electric field is substantially parallel to a ground (see FIG. 2A)

Here, more detailed explanation about the polarized beam splitter 13 will be given with reference to FIG. 4.

As shown in FIG. 4, the polarized beam splitter 13 is composed of right-angle prisms 13A and 13B and a multilayer film 13C made of derivatives. The multilayer film 13C is provided between opposite surfaces $13c$ and $13d$ of right-angle prisms 13A and 13B.

The right-angle prism 13A is positioned so that the incidence angle of the incidence light, which is supplied through the collimator lens 12 (see FIG. 3), becomes perpendicular to the incidence plane $13a$. Thereby, the s-polarized light, which is obtained by splitting the light (un-polarized light) and which travels in a perpendicular direction with respect to a ground, is emitted from the right-angle prism 13A, when the light (un-polarized light) is entered to the right-angle prism 13A.

In the present embodiment, the incidence angle of the incidence light (un-polarized light) with respect to the multilayer film 13C is set at Brewster's angle θ B.

The angle of the inclination surface $13d$ of the right-angle prism 13B is the same as that of the inclination surface $13c$ of the right-angle prism 13A. In other words, the inclination surface $13d$ is parallel with the inclination surface $13c$. Thereby, the p-polarized light whose inclination angle is perpendicular to an emitting plane $13e$ of the right-angle prism 13B is emitted from the right-angle prism 13B.

The multilayer film 13C is composed of low refractive index layers $13f$ and high refractive index layers $13g$, which are stacked by turns. In FIG. 4, the high refractive index layer $13g$ and the low refractive index layer $13f$ are indicated with exaggeration in size. But, the actual thicknesses of the high refractive index layer $13g$ and the low refractive index layer $13f$ are much thinner than illustrated in figure.

According to the polarized beam splitter 13, since the p-polarized light is transmitted through the multilayer film 13C and the s-polarized light is reflected by the multilayer film 13C, the p-polarized light and the s-polarized light are separately obtained from the incidence light (un-polarized light).

The p-polarized light passed through the multilayer film 13C is supplied to the half-wave plate 15 (see FIG. 3). The s-polarized light reflected by the multilayer film 13C is supplied to the reflecting mirror 14 (see FIG. 3).

In the present embodiment, the relationship as shown in following formula (1) has to be satisfied in order to obtain the p-polarized light and the s-polarized light.

$$nG=2\ nH^2nL^2/(nL^2+nH^2) \quad (1)$$

Were, nL is a refractive index of the low refractive index layer $13f$, nH is a refractive index of the high refractive index layer $13g$, and nG is a refractive index of the glass.

In the present embodiment, the p-polarized light and s-polarized light are obtained from the incidence light (un-polarized light) using the multilayer film 13C. The birefringence substances may be adoptable instead of the multilayer film 13C. In this case, the incidence light is split into the p-polarized light and the s-polarized light, depending on the difference of the spread rate of p-polarized light and the spread rate of s-polarized light. As an example of the substances having a birefringence, a calcite ($CaCO_3$) can be cited.

As shown in FIG. 3, the s-polarized light, which is reflected by the polarized beam splitter 13 and came from the polarized beam splitter 13, is reflected by the reflecting mirror 14, and the traveling direction of the s-polarized light is changed toward the lamp cover 17. The s-polarized light then passes through the lamp cover 17 and is emitted toward the outward as a first horizontal polarized light.

The half-wave plate 15 displaces the phase of the p-polarized light by half-wavelength and converts it into the s-polarized light.

Here, the half-wave plate 15 is disposed in an orientation that shifts at 45 degrees with respect to the optical axis of the crystal so that the direction of polarization changes at 90 degrees. Thereby, since the p-polarized light is converted into the s-polarized light by the half-wave plate 15, the s-polarized light goes through the lamp cover 17 and is emitted toward the outward as a second horizontal polarized light.

According to the indicator 10 having above described constructions, the light (un-polarized light) emitted from the light source 11 is adjusted to the light path of respective lights (un-polarized light) parallel with each other, and is entered to the polarized beam splitter 13. Then, the light is split into the p-polarized light and s-polarized light.

Here, the s-polarized light, which is the light whose direction was changed by the multilayer film 13C of the polarized beam splitter 13, is emitted from the polarized beam splitter 13. Then, the s-polarized light reflected by the reflecting mirror 14 goes through the lamp cover 17 and is emitted toward the outward as a first horizontal polarized light.

The p-polarized light, which is the light passed through the multilayer film 13C, is emitted from the polarized beam splitter 13, and is entered to the half-wave plate 15. Then, the p-polarized light is converted into the s-polarized light by the half-wave plate 15 by changing the direction of the polarization (electric field). Then, the light (p-polarized light) passed through the half-wave plate 15 goes through the lamp cover 17 and is emitted outward as the second horizontal polarized light.

Application of the Indicator to the Rear Fog Lamp

Next, the application of the indicator 10 according to the present invention to the rear fog lamp will be explained with reference to FIG. 5 and FIG. 6.

Here, the red colored lamp cover is adopted as the lamp cover 17 (see FIG. 3) of rear fog lamps 20A and 20B shown in FIG. 5 and FIG. 6. Thus, rear fog lamps 20A and 20B illuminate at red.

Figure 5A:
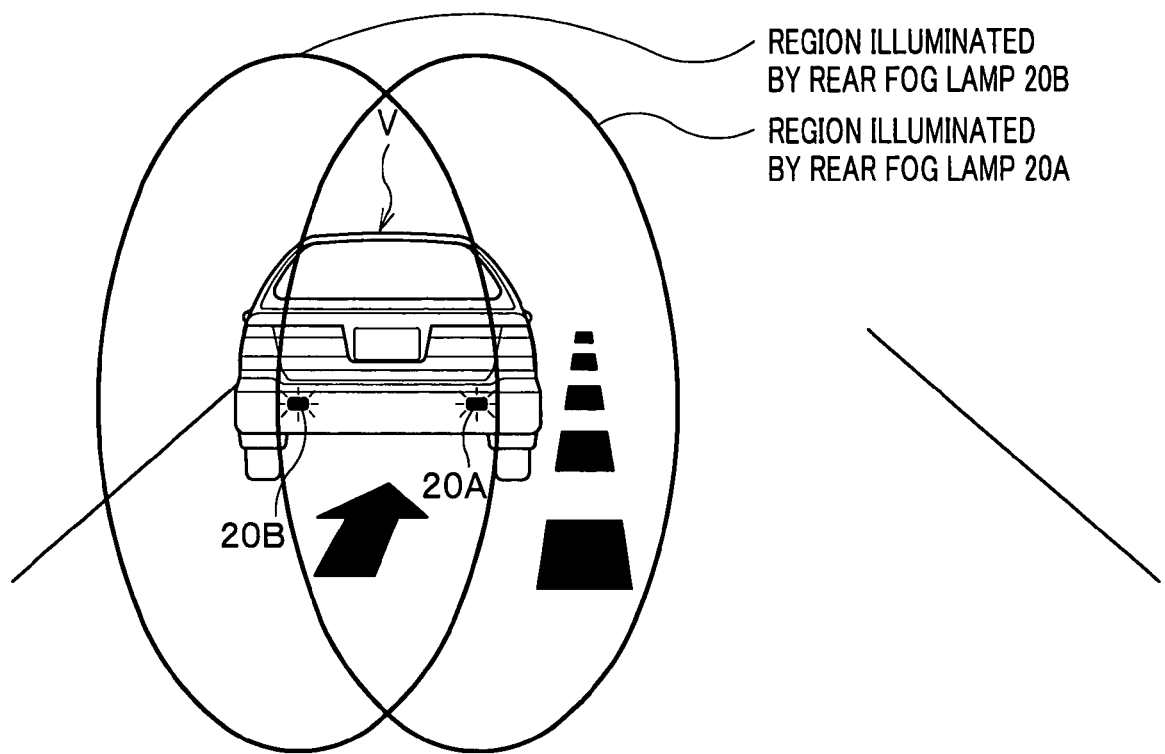
FIG. 5A is an explanatory view showing the region illuminated by rear fog lamps 20A and 20B, which are provided on the vehicle V.
Figure 5B:
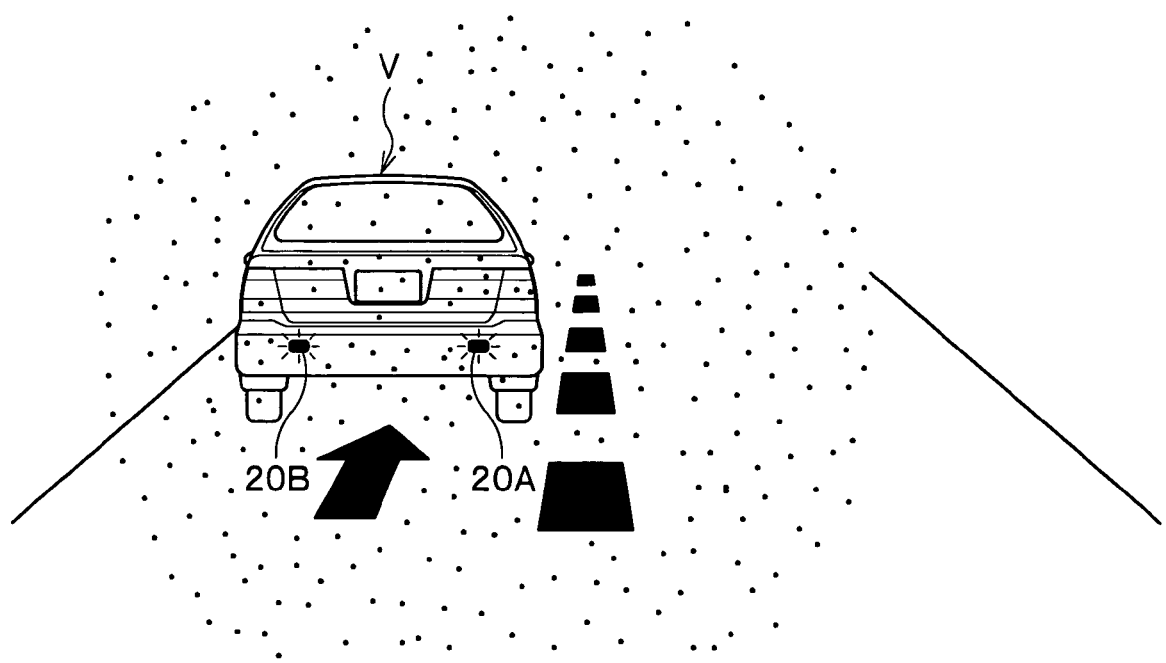
FIG. 5B is an explanatory view, which looks at the vehicle V traveling in fog from a rear direction.

FIG. 5A is an explanatory view showing the region illuminated by the rear fog lamps 20A and 20B, which are provided on the vehicle V. FIG. 5B is an explanatory view, which looks at the vehicle V traveling in fog from a rear direction.

Figure 9A:
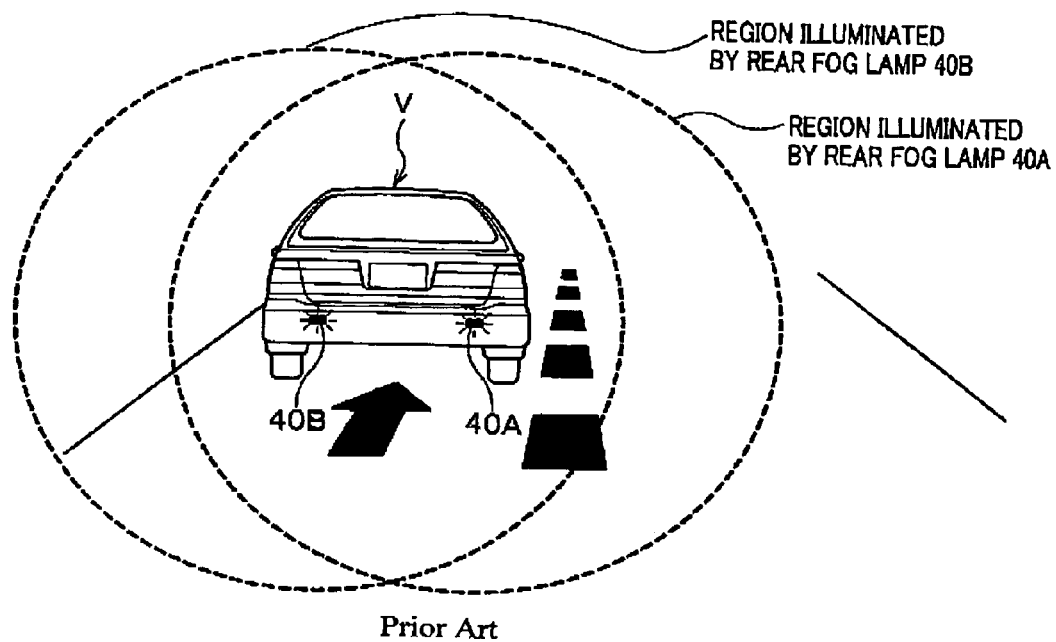
FIG. 9A is an explanatory view showing the region illuminated by width rear fog lamps 40A and 40B.
Figure 9B:
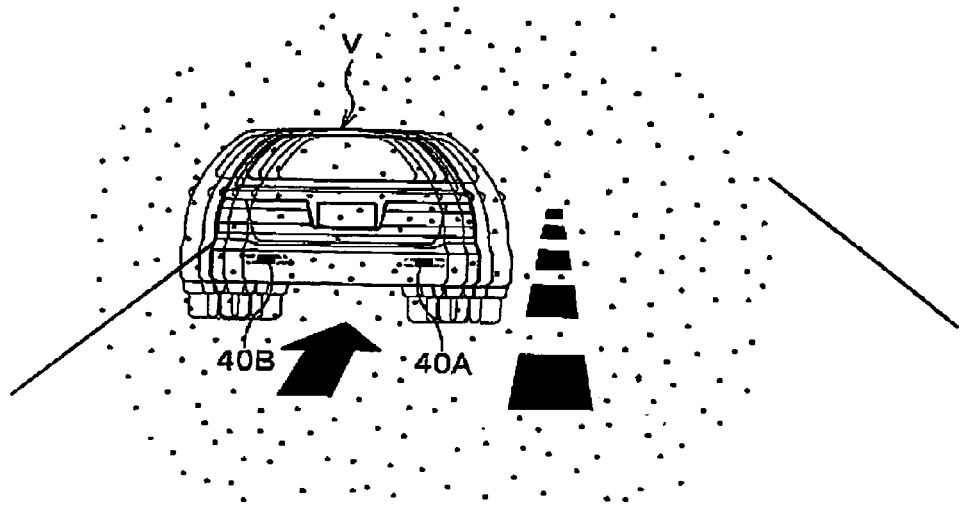
FIG. 9B is an explanatory view, which looks at the vehicle V traveling in fog from a following vehicle.

As shown in FIG. 5A, the light emitted from the rear fog lamp 20A (20B) is a horizontal polarized light whose oscillation direction of the electric field is substantially parallel to a ground. Thus, the occurrence of the diffusion of the light can be reduced in comparison with the light emitted from the conventional rear fog lamp 40A (40B) (see FIG. 9A).

Thus, the contour in the width directions of the vehicle V traveling in fog can be recognized by the following vehicle.

On the contrary, in case of the vehicle adopting the conventional rear fog lamp 40A (40B), the contour in the width directions of the preceding vehicle V traveling in fog cannot be recognized by the following vehicle.

In the present invention, therefore, the width of the vehicle V and the distance from the following vehicle to the proceeding vehicle V are easily recognized by the following vehicle.

In the present embodiment, the improved visibility of the vehicle adopting the indicator has been explained using the vehicle traveling in fog. But, these benefits as described above can be obtained even in hard rain or heavy snow as well.

In the present embodiment, the visibility of the vehicle looked from the following vehicle has been explained. The contour of the vehicle can be recognized by another vehicle and the passenger walking along a road in addition to the following vehicle.

Figure 6A:
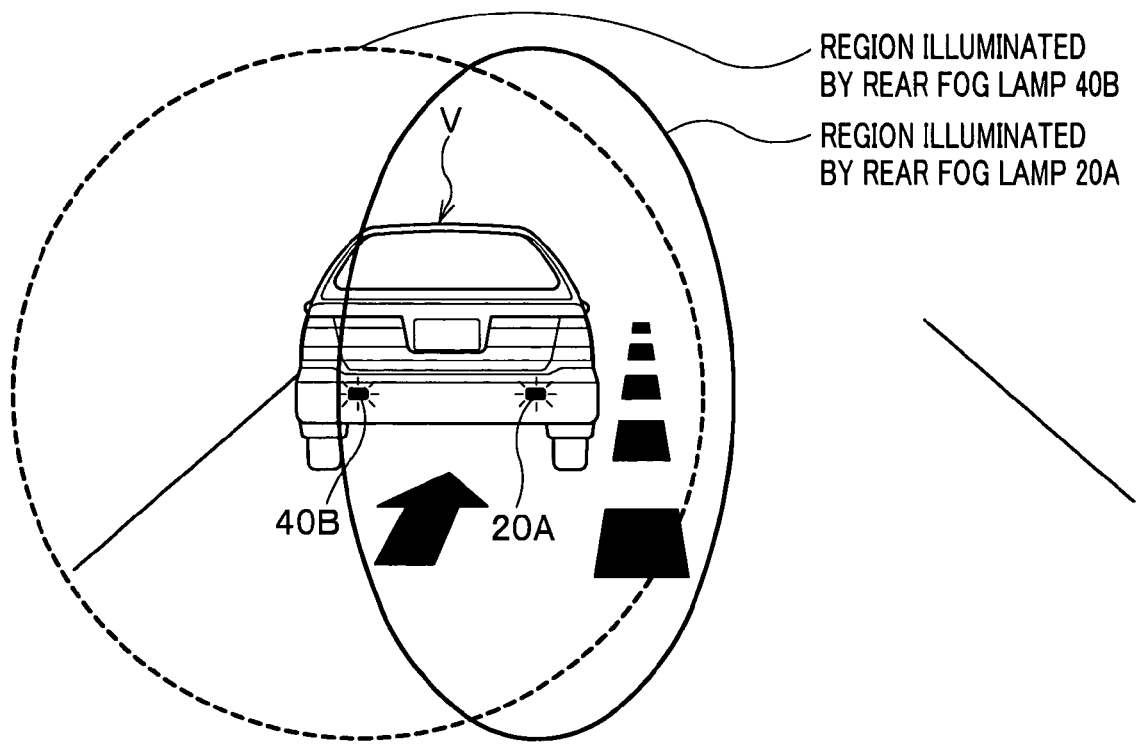
FIG. 6A is an explanatory view showing the region illuminated by the rear fog lamp 20A, which is provided in the center-line side of the vehicle V.
Figure 6B:
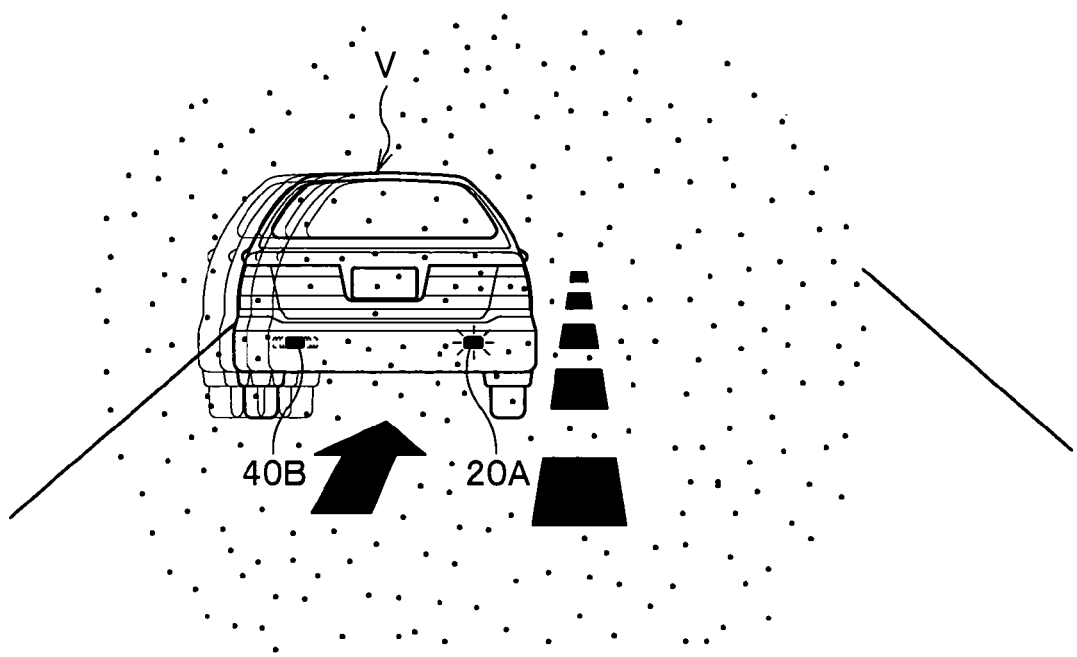
FIG. 6B is an explanatory view, which looks at the vehicle V traveling in fog from a rear direction.

FIG. 6A is an explanatory view showing the region illuminated by the rear fog lamp 20A, which is provided at a center-line side of the vehicle V. FIG. 6B is an explanatory view, which looks at the vehicle V traveling in fog from a rear direction.

As shown in FIG. 6A, if the rear fog lamp 20A adopts the indicator 10 according to the present invention and the rear fog lamp 40B adopts the conventional indicator, the horizontal polarized light is only emitted from the rear fog lamp 20A. In this case, the contour in the center-line side of the vehicle, to which a driver of the following vehicle is paying the attention, can be made clear. Thus, the visibility of the vehicle V from the following vehicle can be improved. In other words, since the indicator 10 of the present invention is provided on the driver's seat side of the vehicle body, the driver on the following vehicle surely recognizes the contour in the driver's seat side of the proceeding vehicle body.

Application of the Indicator to the Width Indicator

Next, the application of the indicator 10 according to the present invention to the width indicator of a vehicle will be explained with reference to FIG. 7 and FIG. 8.

Here, the white colored lamp cover is adopted as the lamp cover 17 (see FIG. 3) of width indicators 30A and 30B shown in FIG. 7 and FIG. 8. Thus, the width indicators 30A and 30B illuminate at white.

Figure 7A:
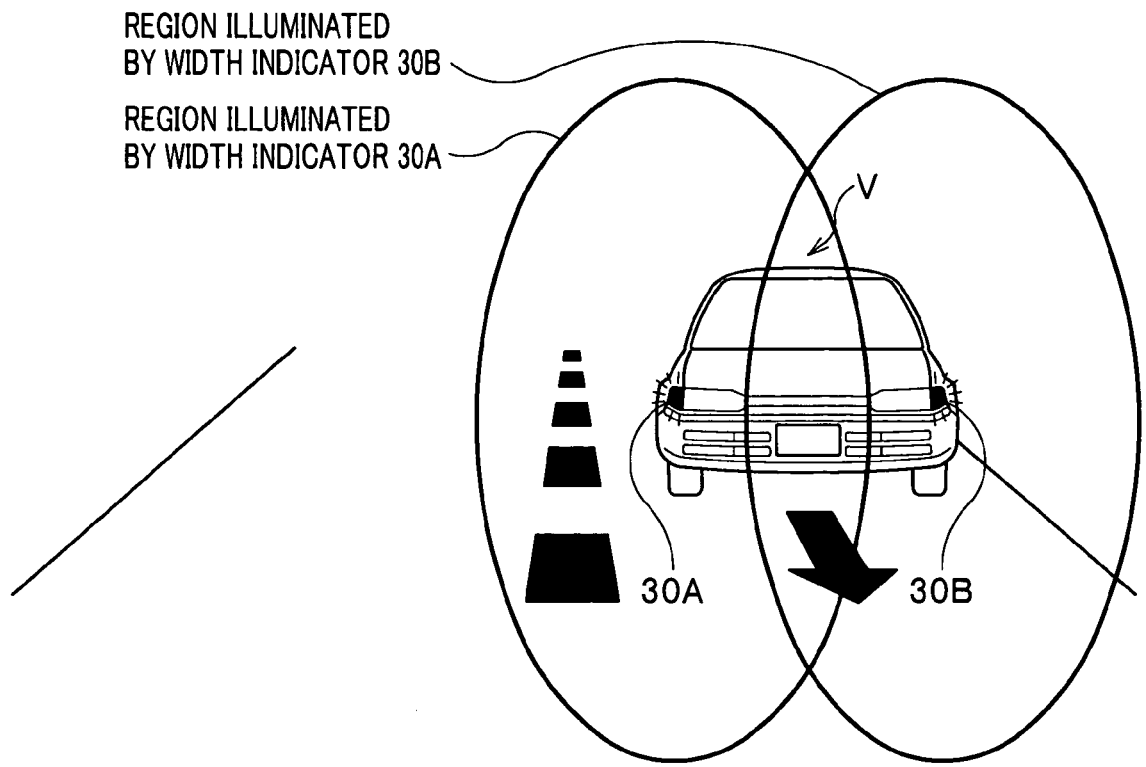
FIG. 7A is an explanatory view showing the region illuminated by width indicators 30A and 30B, which are provided on the vehicle V.
Figure 7B:
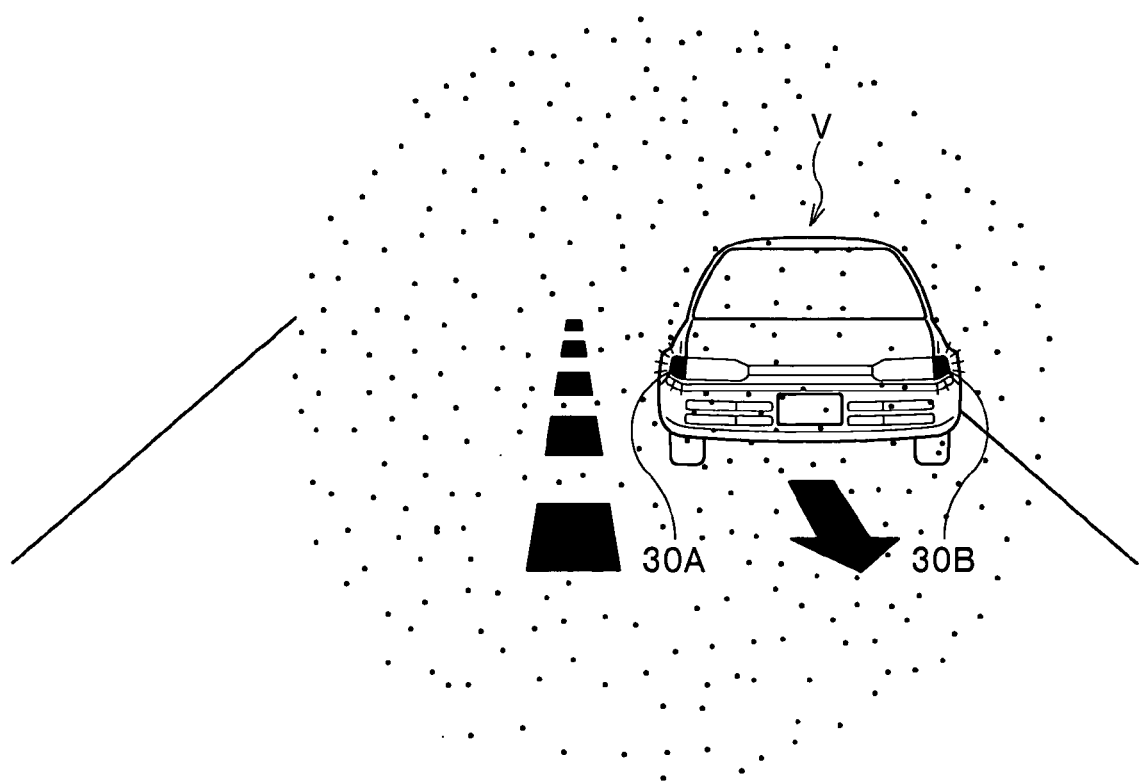
FIG. 7B is an explanatory view, which looks at the vehicle V traveling in fog from a fore direction.

FIG. 7A is an explanatory view showing the region illuminated by width indicators 30A and 30B, which are provided on the vehicle V. FIG. 7B is an explanatory view, which looks at the vehicle V traveling in fog from a fore direction.

Figure 10A:
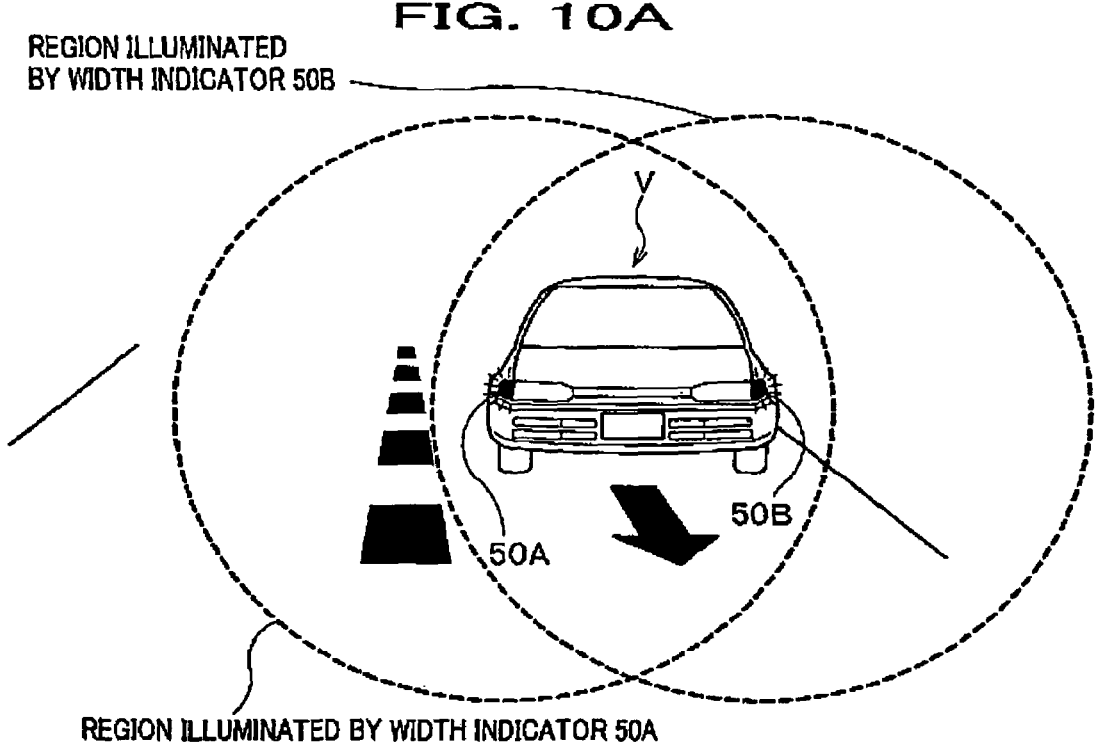
FIG. 10A is an explanatory view showing the region illuminated by width indicators 50A and 50B.

As shown in FIG. 7A, the light emitted from width indicators 30A (30B) is a horizontal polarized light whose oscillation direction of the electric field is substantially parallel to a ground (road). Thus, the occurrence of the diffusion of the light can be reduced as compared to the light emitted from the conventional rear fog lamp 50A (50B) (see FIG. 10A). Thus, the contour in the width directions of the vehicle V traveling in fog can be recognized by the oncoming vehicle.

Figure 10B:
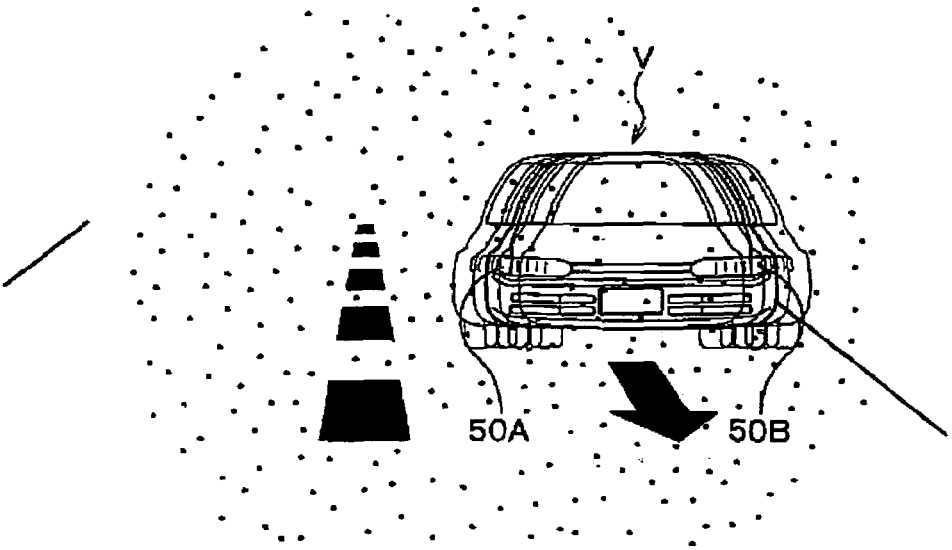
FIG. 10B is an explanatory view, which looks at the vehicle V traveling in fog from a following vehicle.

On the contrary, in case of the vehicle adopting the conventional width indicator 50A (50B) (see FIG. 10B), the contour in the width directions of the vehicle V in fog is not surely recognized by the oncoming vehicle. This is because the contour of the vehicle is obscured due to the diffusion of the light emitted from the conventional width indicator.

In the present invention, therefore, the width of the vehicle and the distance from the oncoming vehicle to the vehicle V are easily recognized by the oncoming vehicle.

As described above, the improved visibility of the vehicle adopting the indicator has been explained using the vehicle traveling in fog. But, these benefits as described above can be obtained even in hard rain and heavy snow.

In the present embodiment, the visibility of the vehicle looked from the oncoming vehicle has been explained. The contour of the vehicle can be recognized by another vehicle and the passenger walking along a road in addition to the oncoming vehicle.

Figure 8A:
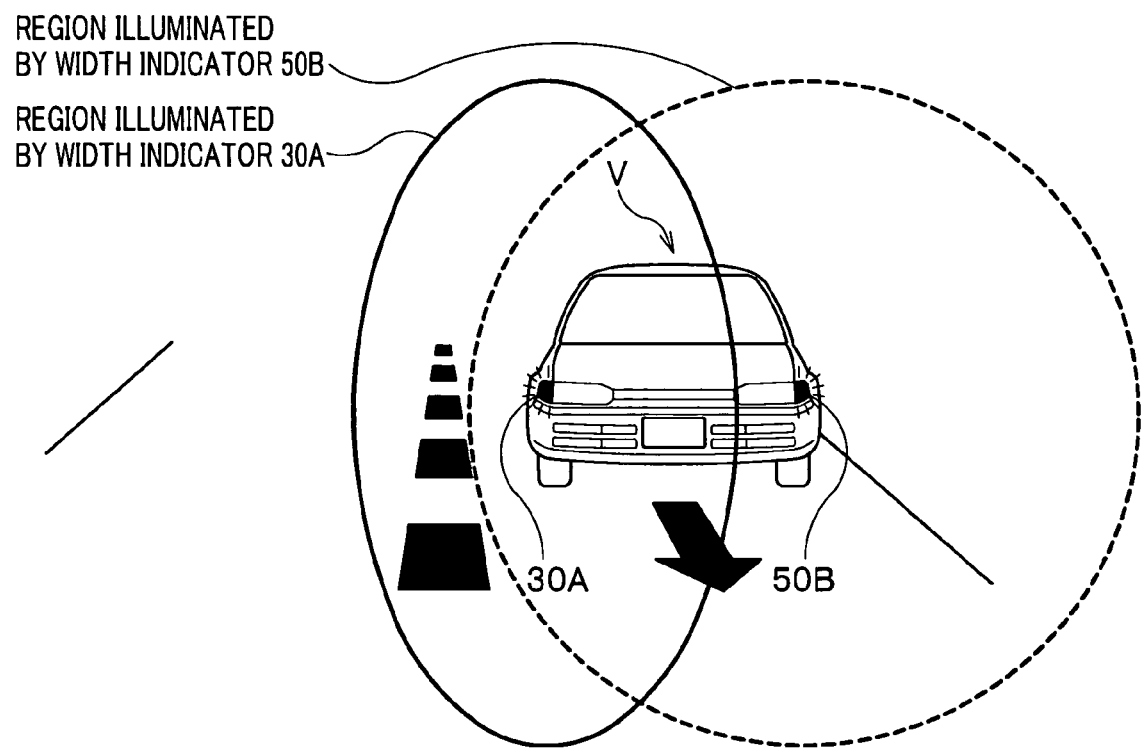
FIG. 8A is an explanatory view showing the region illuminated by width indicators 30A and 50A.
Figure 8B:
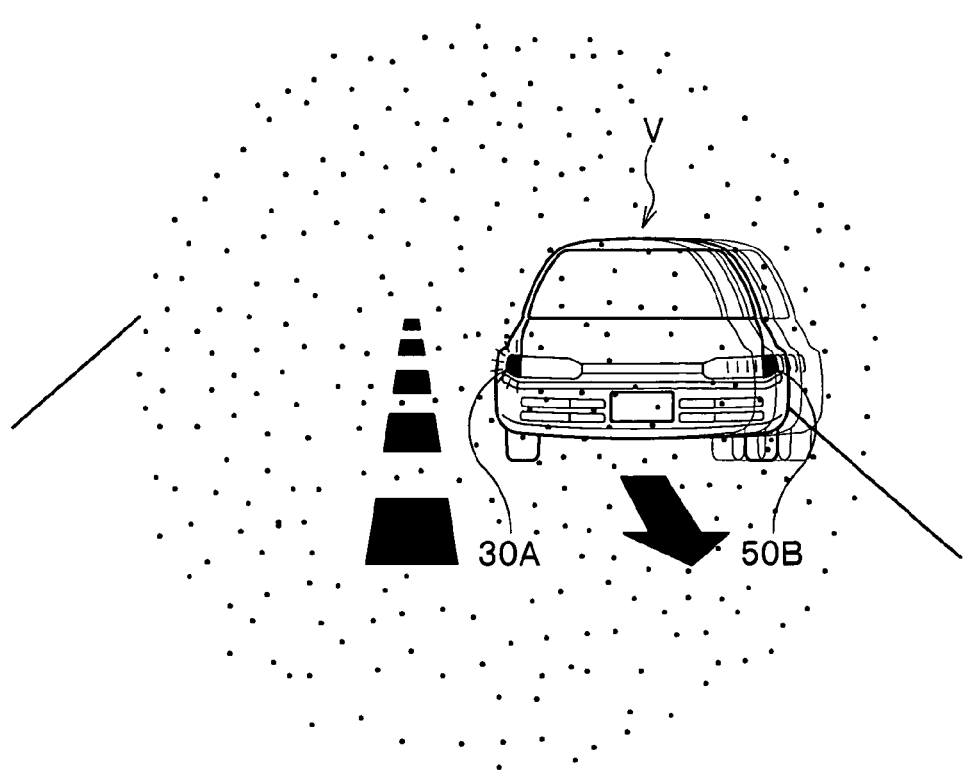
FIG. 8B is an explanatory view, which looks at the vehicle V traveling in fog from fore direction.

FIG. 8A is an explanatory view showing the region illuminated by width indicators 30A and 50A. FIG. 8B is an explanatory view, which looks at the vehicle V traveling in fog from a fore direction.

As shown in FIG. 8A, if the width indicator 30A adopts the indicator 10 according to the present invention and the width indicator 50B adopts the conventional indicator, the horizontal polarized light is only emitted from the width indicator 30A. In this case, the contour in the center-line side of the vehicle, to which a driver of the following vehicle is paying the attention, can be made clear (FIG. 8B). Thus, the visibility of the vehicle V from the oncoming vehicle can be improved. In other words, since the width indicator 10 of the present invention is provided on the driver's seat side of the vehicle body, the driver on the oncoming vehicle surely recognizes the contour in the driver's seat side of the vehicle body.

Although there have been disclosed what are the patent embodiments of the invention, it will be understood by person skilled in the art that variations and modifications may be made thereto without departing from the scope of the invention, which is indicated by the appended claims.

In the present embodiment, p-polarized light and s-polarized light are obtained by splitting the incidence light (un-polarized light), and the s-polarized light is emitted as the first horizontal polarized light. The p-polarized light is emitted as the second horizontal polarized light after converting into the horizontal polarized light by the converter (half wave plate).

Here, if a polarized light splitter is placed so that the incidence plane of the polarized light splitter is parallel to a ground, the p-polarized light emitted from the polarized light splitter can be made as the first horizontal polarized light, and the s-polarized light can be made as the second polarized light after converting into the horizontal polarized light by the converter.

The present invention's indicator can be used as a rear fog lamp, a width indicator, a number-plate light, a taillight, a parking light, a brake light, a direction indicator, and a hazard indicator.

As described above, according to the indicator of the present invention, the oscillation direction of the electric field of at least one of the p-polarized light and the s-polarized light, which are obtained by splitting the incidence light using the polarized light splitter (polarized beam splitter 13), is proximately parallel with respect to a ground. Since the horizontal polarized light (the light goes parallel to a ground) is not so diffused under the adverse condition, such as thick fog or heavy rain, the visibility of the vehicle from a surrounding area can be improved.

In the present invention, one of the p-polarized light and the s-polarized light, which are obtained by splitting the incidence light using the polarized light splitter, is emitted as a first horizontal polarized light whose oscillation direction with respect to the electric field is substantially parallel to a ground, and the other of the p-polarized light and the s-polarized light is emitted as a second horizontal polarized light whose oscillation direction with respect to the electric field is substantially parallel to a ground after converting polarization direction (the oscillation direction of the electric field) by the converter. Thereby, both of the p-polarized light and the s-polarized light can be irradiated outward as a horizontal polarized light.

In this case, therefore, the light (un-polarized light) irradiated from the light source is sufficiently utilized in comparison with the indicator in which one of the p-polarized light and the s-polarized light that are obtained by splitting the light in the polarized light splitter is emitted as the horizontal polarized light.

In the present invention, since the polarized beam splitter is used, the s-polarized light and the p-polarized light are efficiently obtained by splitting the light.

In the present invention, additionally, the half-wave plate is used as the converter, the conversion from the p-polarized light to the s-polarized light and the conversion from the s-polarized light to the p-polarized light can be achieved easily.

In the present invention, if the indicator according to the present invention is used for the width indicator or the rear fog lamp positioned in the vicinity of the center-line side of the vehicle body, the contour in the center-line side of the vehicle, to which a driver of the following vehicle is paying the attention, can be made clear. Thus, the visibility of the vehicle V from the oncoming vehicle can be further improved.

What is claimed is:

1. An indicator provided for a vehicle, the indicator comprising:
a polarized light splitter which penetrates and reflects an un-polarized light irradiated from a light source and divides the un-polarized light into a p-polarized light whose oscillation direction of an electric field is parallel to a incidence plane of the polarized light splitter and an s-polarized light whose oscillation direction of an electric field is perpendicular to the incidence plane, wherein
at least one of the p-polarized light and s-polarized light is emitted from the polarized light splitter as a horizontal polarized light whose oscillation direction of an electric field is substantially parallel to a ground.

2. The indicator according to claim 1 further comprising:
a converter converting the p-polarized light into the s-polarized light or s-polarized light into the p-polarized light, wherein
at least one of the p-polarized light and s-polarized light is emitted from the polarized light splitter as a first horizontal polarized light whose oscillation direction of an electric field is substantially parallel to a ground, and
an other of the p-polarized light and s-polarized light is emitted from the polarized light splitter as a second horizontal polarized light whose oscillation direction of an electric field is substantially parallel to a ground after changing the polarization direction by the converter.

3. The indicator according to claim 2, wherein
the polarized light splitter is a polarized beam splitter.

4. The indicator according to claim 3, wherein
the converter is a half-wave plate.

5. The indicator according to claim 4, wherein
the indicator is provided on the vehicle body positioned in the vicinity of a center line of a road.

6. The indicator according to claim 2, wherein
the converter is a half-wave plate.

7. The indicator according to claim 6, wherein
the indicator is provided on the vehicle body positioned in the vicinity of a center line of a road.

8. The indicator according to claim 2, wherein
the indicator is provided on the vehicle body positioned in the vicinity of a center line of a road.

9. The indicator according to claim 3, wherein
the indicator is provided on the vehicle body positioned in the vicinity of a center line of a road.

10. The indicator according to claim 1, wherein
the polarized light splitter is a polarized beam splitter.

11. The indicator according to claim 10, wherein
the indicator is provided on the vehicle body positioned in the vicinity of a center line of a road.

12. The indicator according to claim 1, wherein
the indicator is provided on the vehicle body positioned in the vicinity of a center line of a road.

13. A vehicle equipped with an indicator of claim 1, wherein
the indicator is provided at a driver's seat side of a body of the vehicle.

14. An indicator provided for a vehicle, the indicator comprising:
a light source which emits an un-polarized light;
a collimator which makes the un-polarized light irradiated from the light source into parallel beams of light by making angles of irradiation in alignment with one another;
a polarized light splitter which splits the un-polarized light passed through the collimator into a p-polarized light whose oscillation direction of an electric field is parallel to a incidence plane of the polarized light splitter and an s-polarized light whose oscillation direction of an electric field is perpendicular to the incidence plane;
a polarization adjustor which emits at least one of the p-polarized light and s-polarized light as a horizontal polarized light whose oscillation direction of an electric field is substantially parallel to a ground.

* * * * *